(12) United States Patent
Dierkes

(10) Patent No.: US 6,682,029 B1
(45) Date of Patent: Jan. 27, 2004

(54) COLLAPSIBLE SATELLITE DISH ANTENNA MOUNT

(76) Inventor: Barry Dierkes, 36325 Indian Knoll Rd., Temecula, CA (US) 92592

( * ) Notice: Subject to any disclaimer, the term of this patent is extended or adjusted under 35 U.S.C. 154(b) by 0 days.

(21) Appl. No.: 10/306,278

(22) Filed: Nov. 27, 2002

(51) Int. Cl.⁷ .................................................. F16M 11/24
(52) U.S. Cl. .................. 248/165; 248/158; 248/288.31; 248/910
(58) Field of Search ............................ 248/910, 288.31, 248/288.51, 158, 127, 165; 343/765, 757, 760, 878, 880, 882

(56) References Cited

U.S. PATENT DOCUMENTS

| | | | | |
|---|---|---|---|---|
| 1,653,897 A | * | 12/1927 | Farr | 248/158 |
| 2,454,897 A | * | 11/1948 | Trowbridge | 343/760 |
| 4,005,607 A | * | 2/1977 | Wiederrich | 73/483 |
| 4,752,780 A | * | 6/1988 | Pipkin | 343/760 |
| 4,793,611 A | * | 12/1988 | Thornell | 273/1.5 R |
| D331,198 S | * | 11/1992 | Nickerson | D10/109 |
| 5,390,914 A | * | 2/1995 | Schroeder | 248/910 |
| 5,660,366 A | * | 8/1997 | Palmer | 248/516 |
| 5,760,751 A | * | 6/1998 | Gipson | 343/880 |
| 5,870,059 A | * | 2/1999 | Reynolds | 343/760 |
| 6,276,649 B1 | * | 8/2001 | Kruse | 248/346.01 |

FOREIGN PATENT DOCUMENTS

| | | | | |
|---|---|---|---|---|
| JP | 359055602 A | * | 3/1984 | 342/443 |
| JP | 359066205 A | * | 4/1984 | 343/878 |

* cited by examiner

Primary Examiner—Korie Chan
(74) Attorney, Agent, or Firm—Michael Bak-Boychuk

(57) ABSTRACT

An array of cooperating parts useful to form a water ballasted satellite dish antenna mount includes a hollow base container provided with an annulus into which an adjustable mount is keyed and inserted. Once inserted an end mounting post on the mount is aligned to a vertical alignment with the assistance of a bubble level in the post end to support the dish antenna thereon. The base container further includes a magnetic compass on the upper surface thereof with the compass azimuth markings then repeated on the mount. The base container and the mount further include engagement devices for attaching the base and the mount to each other when disassembled.

8 Claims, 3 Drawing Sheets

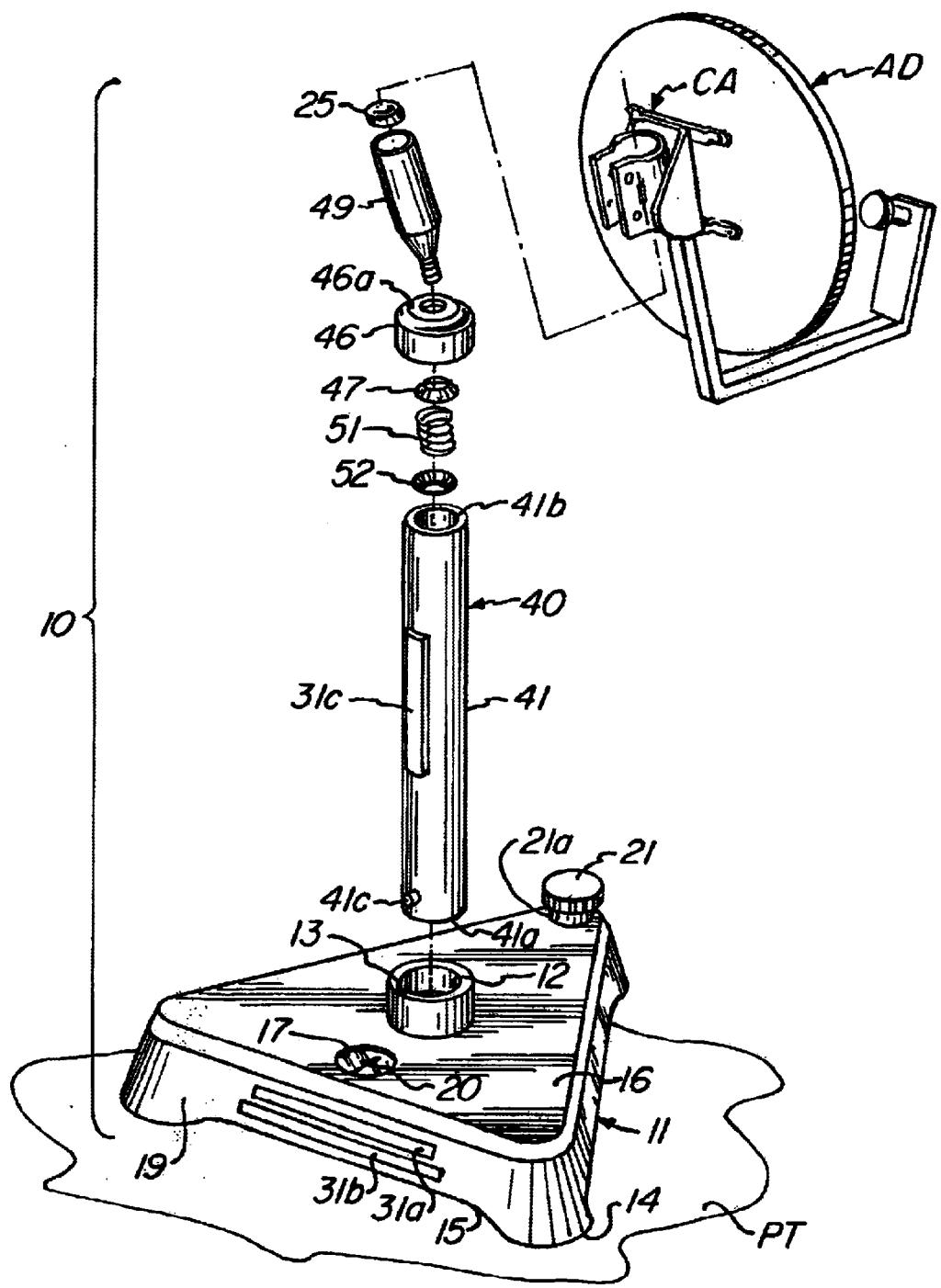
FIG.—1

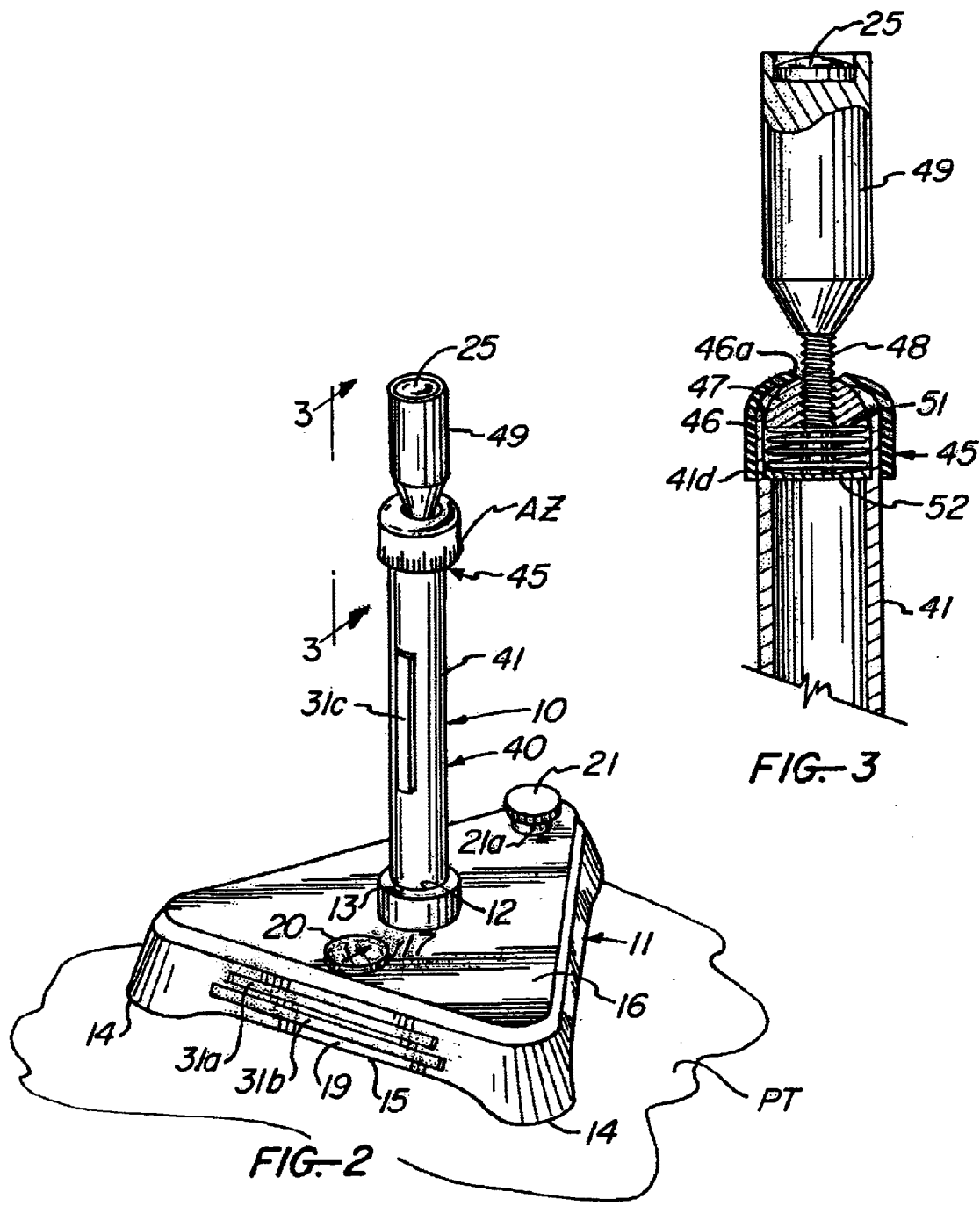

COLLAPSIBLE SATELLITE DISH ANTENNA MOUNT

BACKGROUND OF THE INVENTION

1. Field of the Invention

The present invention relates to satellite dish antenna mounts, and more particularly to a conveniently transported mount assembly useful to combine into a dish antenna mount that may be generally fixed at various selected orientations.

2. Description of the Prior Art

The transmission of television and other similar signals has gone through several evolutions, first in the form of broadband radio signal then followed by various land lines or cable networks. In each instance either the physical burden of various in-ground or overhead cables or the width of the useable electromagnetic spectrum have limited the number of available programming sources. The granulation of available programming bandwidths, however, has recently gone through a dramatic evolutionary step with the recent advent of transmission techniques relying on geosynchronous satellites each serving as the signal emitting source for a particular program grouping, this evolution then being further reinforced by legislation like the Telecommunications Act of 1996.

In this latter method the satellites associated with each particular signal group are distributed equatorially above the Earth, with a singular line of sight set of coordinates then ascribed to each geographic location. These alignment coordinates are then used for orienting the sensing axes of highly polarized antennae generally known as a satellite dish. The fixed nature of the viewing coordinates has led to a generally universal, more or less permanent, installation process with the fixed satellite dish mounting structure positioned adjacent the residence that is serviced thereby and the installation process then providing the customer garnering mechanism for a particular program source.

In typical practice the coordinates for each antenna location are expressed as a corrected magnetic North azimuth and degrees of elevation from the local horizontal plane. As a consequence installation facility has become generally widespread and along with the wide acceptance of satellite programming by fixed residences there has also now emerged a robust trend to implement movable structures like recreational vehicles or motor homes with deployable antenna mounts. These deployable mounts most often follow the earlier practices of satellite based surveying or measuring antennae typically supported on an adjustable tripod, such as those described in U.S. Pat. No. 4,767,090 issued to Hartman, et al.; U.S. Pat. No. 5,249,766 issued to Vogt; U.S. Pat. No. 5,614,918 issued to Dinardo, et al.; U.S. Pat. No. 5,769,370 issued to Ashjace; U.S. Pat. No. 6,450,464 issued to Thomas; and others. Similar tripod mounted structures are also commercially sold, as for example the tripod mount sold under the model designation TR-2000 Tripod/Base Mount by the Winegard Company, 3000 Kirkwood Street, Burlington, Iowa 52601-2000. While suitable for the purposes intended each of the foregoing entail complex assortments of parts which include metal structures that distort or wholly obliterate any magnetic compass reading, while those made wholly of plastic like the antenna mount sold under the mark or model "The Buoy" by Camping World, Three Springs Road, P.O. Box 90017, Bowling Green, Ky. 42102-9017, lack the leveling indicia for alignment precision. Thus either the resulting measurement and erection complexity or lack of precision have unnecessarily detracted from the use convenience and proliferation of the deployable mount has been less than ringing in the recent past. A conveniently assembled, non-metallic mount structure is therefore extensively desired and it is one such structure that is disclosed herein.

SUMMARY OF THE INVENTION

Accordingly, it is the general purpose and object of the present invention to provide an erectable antenna mount assembly all the parts thereof being formed from non-magnetic materials.

Other objects of the present invention are to provide a conveniently erected antenna mount assembly supported on a base container that is selectively ballasted by storing water therein.

Further objects of the invention are to provide an array of cooperating parts that are conveniently interlocked and thereafter aligned to support an antenna dish.

Yet additional objects of the invention are to provide an interlocking array of parts that is easily assembled to form a satellite dish antenna mount provided with structural interlocks that are engaged without substantial ambiguity.

Briefly, these and other objects are accomplished within the present invention by providing a generally hollow base formed as an annular liquid container having the central opening therein keyed and dimensioned for conforming orthogonal receipt of a similarly keyed end of a cylindrical mount. The other end of the mount is then provided with a selectively releasable universal swivel fixed by threaded advancement of the bottom end of a support post extending therefrom. The support post, in turn, terminates at the other end in a dished cavity into which a leveling bubble assembly is placed which is then useful to align the support post on the cylindrical mount to a generally vertical alignment regardless of the inclination of the hollow base. Once aligned the base is then filled with water to provide ballast fixing the base on the ground.

Preferably the hollow base, the cylindrical mount and the support post are all formed of a polymeric material structure, such as polyvinyl chloride or other generally rigid polymer structure having material properties that allow the machining and cutting thereof. Similarly, the pivoting mechanism fixing the support post alignment relative the cylindrical mount also comprises non-magnetic components, the non-ferrous assembly therefore allowing use of an inexpensive magnetic compass to assist in the orientation of the base along a predetermined azimuth. In this manner the induced magnetic distortion errors that are usually associated with unwanted distortions of the local magnetic field are wholly avoided. This cooperative structural arrangement is further simplified by way of a threaded extension of the mounting post into a domed ball surface captured between a cap on the end of the cylindrical mount by a helical spring and a dished surface within the cylinder opposing the threaded extension or the post so that a partial turn thereof then provides the frictional interlock to fix its generally vertical alignment as determined by the bubble level seated in the free end of the post. A satellite dish antenna, conventionally provided with elevation adjustment, can then be fixed to the mounting post along the azimuth referenced to the compass.

One will appreciate that the planform of the base container and its several surfaces may be variously shaped for clear visual indication of the azimuth alignment thereof. Moreover various storage provisions may be formed in the surfaces of the container that retain the compass and the component array of the cylindrical support assembly. In this manner a convenient, easily transported and easily aligned antenna mount assembly is provided that is useful at all geographic locations.

BRIEF DESCRIPTION OF THE DRAWINGS

FIG. 1 is a perspective illustration, separated by parts, of the inventive satellite dish antenna mount assembly;

FIG. 2 is yet another perspective illustration of the inventive antenna mount assembly in its deployed form;

FIG. 3 is a sectional detail view taken along line 3—3 of FIG. 2;

DESCRIPTION OF THE PREFERRED EMBODIMENT

Figure 4:
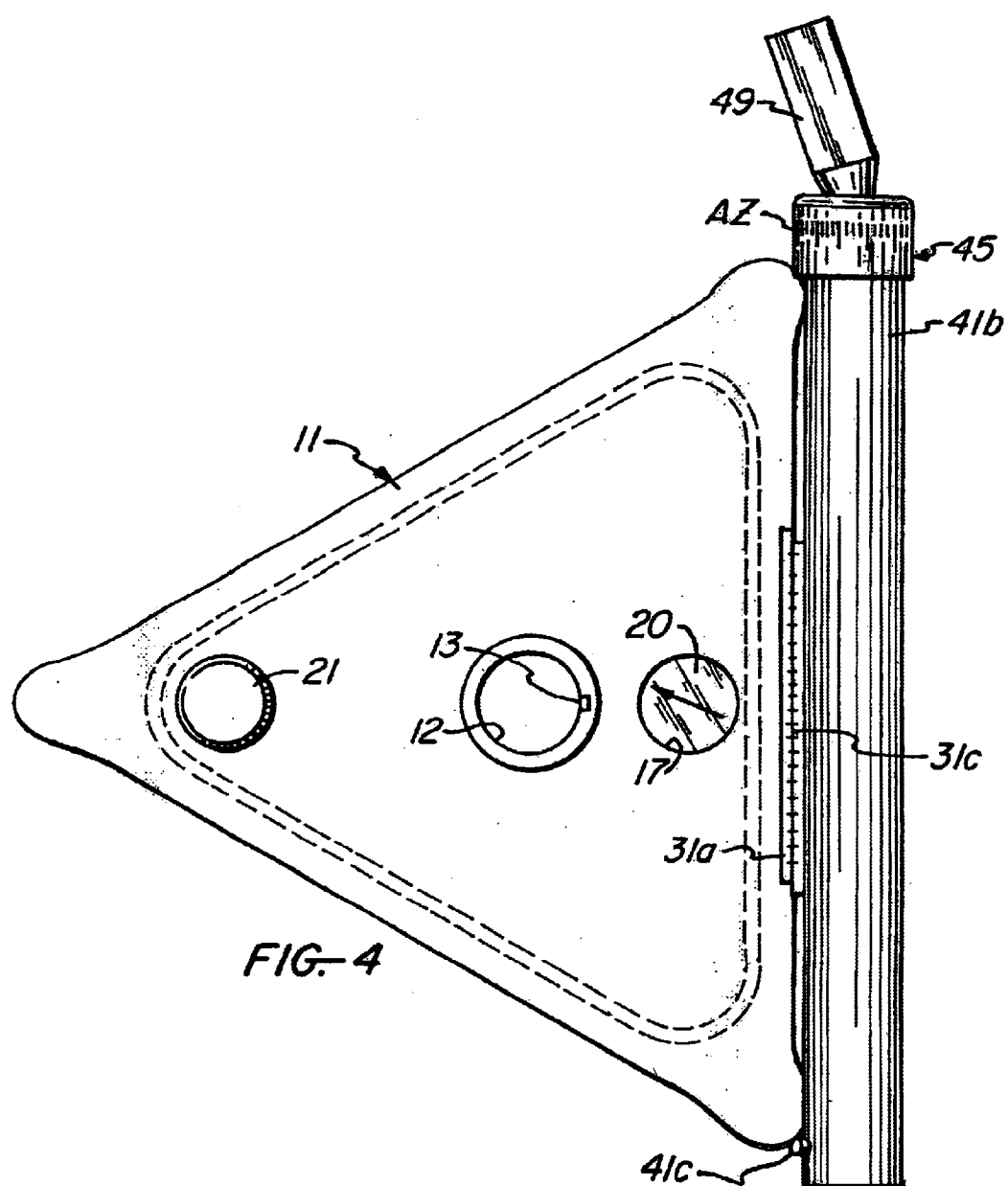
FIG. 4 is a plan view illustration of the inventive antenna mount assembly in its collapsed form for convenient storage.
Figure 5:
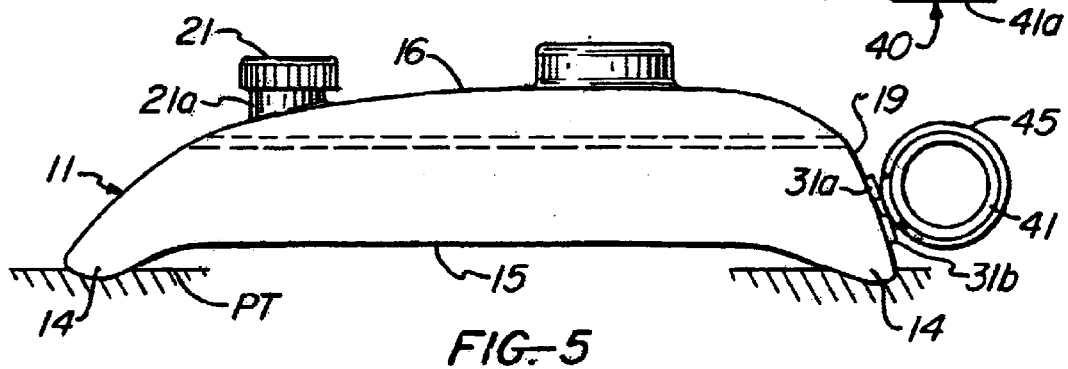
FIG. 5 is a side view of the collapsed assembly shown in FIG. 4.

As shown in FIGS. 1 through 5, the inventive antenna mount assembly, generally designated by the numeral 10, includes a hollow base container 11 of a generally triangular planform provided with a vertically aligned circular annulus 12 radially deformed to include a keyway 13, thus forming a triangular enclosure supported on pads 14 along its bottom surface 15 at each apex of the triangle. The upper surface 16 of the container 11, in turn, is provided with a circular depression 17 conformed for fitted receipt of a magnetic compass 20 adjacent one rear panel 19 of the container which further includes in opposed alignment at the distally opposite apex a fill opening 21a closed by a threaded cap 21, thus forming an enclosure into which water can be selectively admitted to weigh down the base and thereafter drained out before transport.

The generally elongate rear surface 19 may also serve as a storage panel for the other components of the assembly 10, including the storage of a cylindrical mount assembly 40 effected by hoop-and-pile strips 31a and 31b adhered on surface 19 engaging a similar strip 31c on the exterior of a cylindrical segment 41 forming the primary support element of mount assembly 40. Upon arrival to the placement site or terrain PT where the satellite dish antenna is to be deployed, the mount assembly 40 is released from this captive engagement and then fixed in the annulus 12 of the base container 11 by inserting the lower end 41a of the cylindrical segment 41 therein. The upper end 41b of segment 41 is then useful to deploy an adjustably securable universal pivot structure generally shown at 45, described in more detail below, above the base with the receiving orientation of segment 41 in annulus 12 fixed by a projecting key 41c inserted in the keyway 13 that is also aligned with a north-south orientation of the compass azimuth and the planform position of the fill opening 21a. Thus a coordinated north-south orientation is provided in the alignment of the magnetic compass 20 and also in the orientation of the apex marked by the fill opening 21a relative the rear surface 19. Once the assembly is thus generally aligned the final adjustment to a vertical orientation is effected by manual movement of an adjustable mounting post 49 that projects from the universal pivot structure 45 with the assistance of a bubble level 25 seated in the free end of the post. The assembly is then in position to support the conventionally vended antenna dish assembly AD that itself includes further provisions for the final elevation and azimuth adjustments.

Those in the art will appreciate that an equatorial geosynchronous satellite transmission system will invariably entail a generally southward antenna focus for all receiving antennae in the northern hemisphere of the Earth while those viewing in the southern hemisphere will necessarily be pointing generally northward. Thus a well indicated north-south orientation greatly assists in selecting the desired terrain on which the assembly is erected, particularly since the range of any adjustment is always limited. To further assist in the final alignment of the dish AD the pivot assembly 45 may also include azimuth markings AZ about its periphery geometrically referenced through the keyed insertion of the cylindrical segment. Thus all the necessary indicia are imbedded in the inventive assembly which is then fixed by water ballast in the base.

In more detail, pivot structure 45 is defined by an end cap 46 mounted onto the upper end 41b of segment 41 to capture therebetween a generally hemispherical, centrally threaded pivot base 47 engaged by a threaded projection 48 extending axially from the mounting post 49 into the interior of cap 46 through a chamfered opening 46a. The interior surface of the segment's upper end is further provided with an internal seat or shoulder 41d supporting the peripheral edge a circular dished plate 52 aligned to oppose and thus limit the threaded advancement of projection 48 through the pivot base 47. A helical spring 51 compressed between plate 52 and the pivot base 47 then maintains frictional contact between the pivot base and the interior surface of cap 46, right at the chamfered edge of the opening 46a, and the dished arc of plate 52, selected to match the pivot arc of projection 48, is then useful to lock the post alignment with a small, fractional further turn advancing projection 48 against plate 52, thus providing a convenient locking mechanism fixing the post relative the cylinder 41. This conveniently locked and unlocked final alignment of the post 49 is made with concurrent visual reference to the bubble level 25 received in the free end of the post. Once thus aligned to a vertical alignment and locked, the mounting post is then captured by the clamping attachment CA normally provided with the antenna dish AD, fixing the antenna along the specified azimuth and elevation. This azimuth selection may be further assisted by scribing the exterior of cap 46 with the compass markings AZ that are coordinated with the compass alignment in the base.

It will be appreciated that the foregoing structure may be conveniently formed thereof can be effected by well known adhesive processes. Moreover, by selecting conventional pipe dimensions commercially vended water conveying or electrical pipe can be utilized along with all the conventional fittings and caps that are concurrently vended therewith. The hook-and-pile strips are similarly of conventional form, often referred to by their mark or style "Velcro" and variously distributed as strips provided with adhesive backing. Thus widely available, conveniently formed and assembled components are combined to form an antenna mount that is easily and accurately deployed.

Obviously, many modifications and variations can be effected without departing from the spirit of the invention instantly disclosed. It is therefore intended that the scope of the invention be determined solely by the claims appended hereto.

It is claimed:

1. A deployable assembly cooperating upon the erection thereof to provide an adjustable mount for supporting a satellite dish antenna at various locations, comprising:

a generally hollow base container defined by an upper and lower surface joined at the common peripheries thereof and including a keyed central annulus therebetween, said upper surface further including a fill opening therein provided with a closure and a magnetic compass aligned along the common alignment between said annulus and fill opening;

a mount including a cylindrical segment conformed for keyed receipt of one end thereof in said annulus and including a mounting post at the other end engaged by a manually operable pivot for selecting the alignment of said post relative said segment, said pivot including a perforated cap secured to said other end of said segment, a generally hemispherical threaded fitting retained within the common interior of said cap and segment, a helical spring for urging said fitting against said cap, a threaded projection extending from said post through the perforation in said cap and threadably passing through said fitting and opposing means fixed in said segment for opposing said spring and further threaded advancement of said projection; and level indicating means secured to said mounting post.

2. An assembly, according to claim 1, further comprising:

engagement means attached to said base and said mount for storing said mount along said base upon the removal of said segment from said annulus.

3. An assembly, according to claim 2, wherein:

said upper and lower surface of said hollow base are each of a generally triangular planform separated from each other to define a cavity therebetween and joined at the common peripheries thereof.

4. An assembly, according to claim 3, wherein:

said base container and said mount include polymeric material structures.

5. A deployable assembly of cooperating parts conformed to provide upon the erection thereof an adjustable mount for supporting a satellite dish antenna at various locations, comprising:

a generally hollow base container defined by an upper and lower surface each of a generally triangular planform separated from each other to define a cavity therebetween and joined at the common peripheries thereof and including a keyed central annulus, said upper surface further including a fill opening therein provided with a closure proximate one apex of said generally triangular planform and a magnetic compass aligned along a common plane between said annulus and fill opening;

a mount including a cylindrical segment conformed for keyed receipt of one end thereof in said annulus and including a mounting post at the other end engaged by a manually operable pivot for selecting the alignment of said post relative said segment, said pivot including a perforated cap secured to said other end of said segment, a generally hemispherical threaded fitting retained within the common interior of said cap and segment, a helical spring for urging said fitting against said cap, a threaded projection extending from said post through the perforation in said cap and threadably passing through said fitting and opposing means fixed in said segment for opposing said spring and further threaded advancement of said projection; and level indicating means secured to said mounting post.

6. An assembly, according to claim 5, further comprising:

engagement means attached to said base and said mount for storing said mount along said base upon the removal of said segment from said annulus.

7. An assembly, according to claim 6, wherein:

said base container is conformed for storing liquid therein.

8. An assembly, according to claim 7, wherein:

said base container and said mount include polymeric material structures.

* * * * *